United States Patent [19]

Bleier et al.

[11] Patent Number: 5,024,514

[45] Date of Patent: Jun. 18, 1991

[54] LATERAL TRANSFER RETROREFLECTOR AND ROOF MIRROR FOR SAME

[75] Inventors: Zvi Bleier, Wantagh; Morton S. Lipkins, Bayside, both of N.Y.

[73] Assignee: Precision Lapping & Optical Co., Inc., Valley Stream, N.Y.

[21] Appl. No.: 511,711

[22] Filed: Apr. 18, 1990

[51] Int. Cl.⁵ .......................... G02B 5/08; G02B 5/12; G02B 7/18; G02B 27/10

[52] U.S. Cl. .................................. 350/618; 350/616; 350/622; 350/102; 350/171

[58] Field of Search ............... 350/618, 612, 616, 631, 350/622, 102, 107, 171; 372/107, 99

[56] References Cited

U.S. PATENT DOCUMENTS

| | | |
|---|---|---|
| 3,663,084 | 5/1972 | Lipkins . |
| 3,977,765 | 8/1976 | Lipkins .................. 350/107 |
| 4,065,204 | 12/1977 | Lipkins .................. 350/102 |
| 4,319,804 | 3/1982 | Lipkins .................. 350/622 |
| 4,367,922 | 1/1983 | Lipkins .................. 350/618 |

Primary Examiner—Jon W. Henry
Attorney, Agent, or Firm—Gottlieb, Rackman & Reisman

[57] ABSTRACT

This invention relates to lateral transfer retroreflectors having a tubular member comprised of a material having dimensions which are relatively stable with respect to temperature. The retroreflector is further comprised of a roof mirror having two reflective surfaces mounted to one end of the tubular member at three coplanar mounting surfaces of the roof mirror. Mounted on the opposite end of the tubular member is a mirror panel having a reflective surface which is perpendicular to both of the reflective surfaces of the roof mirror. The tubular member has openings for light to pass through and thereby reflect off of the roof mirror and the mirror panel. One of the openings increases the effective aperture of the lateral transfer retroreflector.

39 Claims, 4 Drawing Sheets

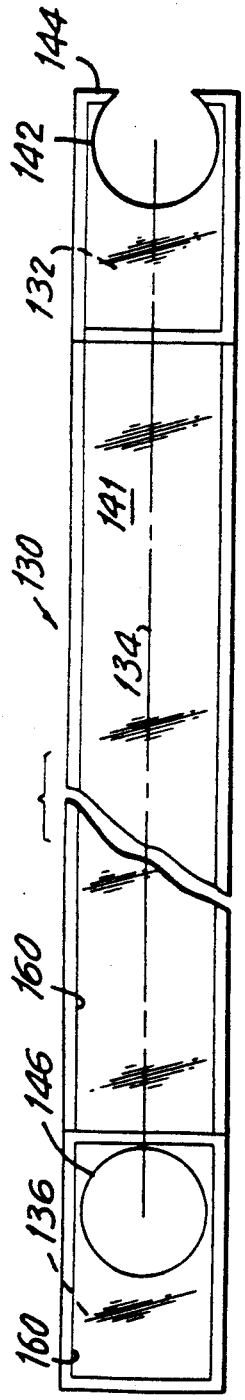
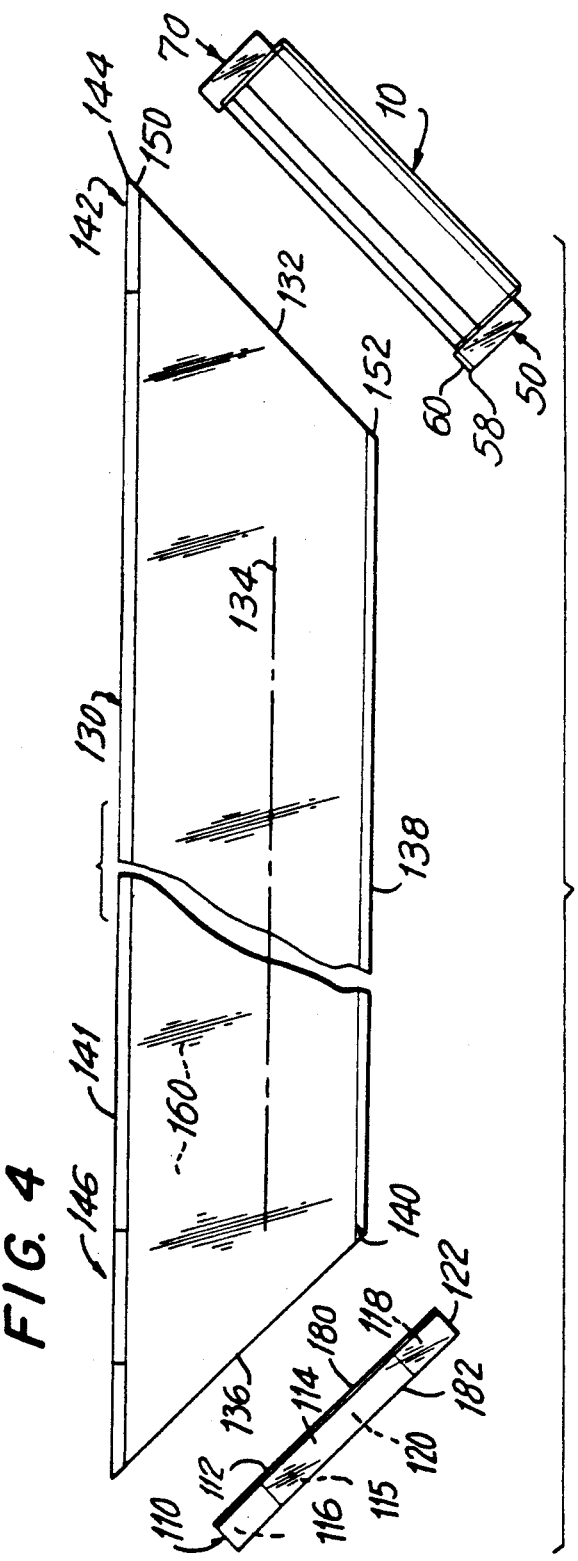
FIG. 3
FIG. 4

LATERAL TRANSFER RETROREFLECTOR AND ROOF MIRROR FOR SAME

TECHNICAL FIELD

This invention relates to the field of lateral transfer retroreflectors. More particularly the invention relates to hollow lateral transfer retroreflectors.

BACKGROUND ART

U.S. Pat. No. 4,065,204, to Morton S. Lipkins, discloses a lateral transfer retroreflector which can be precisely adjusted so that an incoming ray is reflected laterally through an offset distance and then reversely, parallel to the incoming ray. The apparatus includes a base, a roof reflector having two reflecting plates and a third reflector.

U.S Pat. No. 3,936,194, also to Morton S. Lipkins, discloses a method and device for assembling and aligning hollow retroreflectors. The teaching therein is especially applicable to hollow lateral transfer retroreflectors.

While the structure set forth in U.S. Pat. No. 4,065,204 provides an apparatus which can be adjusted for high precision, in that the reflected beam is parallel to the incoming beam to a high degree of accuracy, the reflectors are secured to one another and to the base member along the entire length of edges and marginal surfaces thereof. Thus, extreme variations in temperature tend to introduce stresses which can distort the optical surfaces or have a detrimental effect upon their relative alignment, thus causing accuracy to suffer.

SUMMARY OF THE INVENTION

It is an object of the present invention to provide a lateral transfer retroreflector which is inexpensive, easy to assemble and maintains precise alignment when undergoing extreme changes in temperature.

It is a further object of the invention to provide a roof mirror assembly for use in a lateral transfer reflector wherein the components are kinematically supported.

It is yet another object of the invention to provide a hollow roof reflector having a support member with an opening which increases the effective aperture of the lateral transfer retroreflector.

In accordance with the invention the lateral transfer retroreflector comprises a tubular member of a material having dimensions which are relatively stable with respect to temperature, such as fused quartz. The tubular member has a first slanting surface at a first end thereof. A roof mirror having two reflective surfaces is mounted to the first slanting surface at three coplanar mounting surfaces of the roof mirror assembly. A mirror panel having a reflective surface is mounted at a second end of a tubular member opposite the first end so that the reflective surface of the mirror panel is perpendicular to the two reflective surfaces of the roof mirror. The tubular member has openings so that light can pass through the tubular member to the roof mirror and the mirror panel.

The roof mirror includes a first planar member having a first reflective surface, a second planar member having a second reflective surface, a first support panel and a second support panel for supporting the first planar member and the second planar member at a predetermined angle with respect to one another. The first support panel has a first support edge with a raised portion having thereon a first of the coplanar surfaces. The second support panel has a second support edge including a second one of the coplanar surfaces and a third one of the coplanar surfaces. The second coplanar surface and the third coplanar surface are separated by an opening in the second support panel. An adhesive secures each of the three coplanar surfaces to the first slanting surface.

The mirror panel has an edge surface for engaging an inside surface of the tubular member. Preferably, the tubular member has a rectangular cross-section and the mirror panel is a substantially rectangular member. The tubular member has a second slanting surface at its second end parallel to the first slanting surface. The second slanting surface engages an edge surface of the mirror panel. Preferably there is an adhesive between only a portion of the second slanting surface and the edge surface engaged thereby.

Preferably, a first edge surface of the mirror panel contacts an internal surface of the tubular member and a second edge surface of the mirror panel, which is perpendicular to the first edge surface, contacts the second slanting surface. A recess in the first edge surface of the mirror panel defines a space between a portion of the first edge surface and the inside surface of the tubular member. An adhesive is disposed between the first planar surface and the inner surface of the tubular member, between the second planar surface and the inner surface of the tubular member, and between the second edge surface and the second slanting surface only at a region most remote from the inner surface of the tubular member to which the first and second planar surfaces are adhered.

Also in accordance with the invention, a hollow roof mirror assembly comprises a first member having a first reflective planar surface, a first length defining edge and a first edge surface. A second member of the roof mirror assembly has a second reflective planar surface, a second length defining edge and a second edge surface. The first member and the second member are positioned with respect to one another so that the first length defining edge of the first member contacts the second planar surface of the second member. A first support panel engages the first planar surface of the first member and the second edge surface of the second member. A second support panel engages the second planar surface of the second member and the first edge surface of the first member.

Preferably, at least one of the first support panel and the second support panel has an opening therein which increases the size of the aperture for the transmission of light to or from the reflective planar surfaces of the first member and the second member.

At least one of the first edge surface of the first member and the first edge surface of the second member has a recess therein. The recess defines a space between the member and a respective one of the support panels to which the edge surfaces are fixed. An adhesive is disposed between the edge surfaces and respective support panels only at regions other than the recess.

In accordance with the invention one of the support panels has a support edge surface extending substantially parallel to a line along which the first member contacts the second member. The support edge surface has a mounting projection extending therefrom. The mounting projection has a mounting surface which extends parallel to the line.

Another of the support panels has a mounting edge surface extending parallel to the mounting surface of the projection and an opening defining a recess in the mounting edge surface so that a first planar mounting surface is disposed to a first side of the recess and a second planar mounting surface is disposed to a second side of the recess opposite the first side. The mounting surface of the projection, the first planar mounting surface and the second planar mounting surface are all co-planar.

Preferably the first member and the second member are substantially rectangular and have substantially equal length in a direction along the line along which said first member contacts said second member. The first member extends along the line past the edge of the second member.

BRIEF DESCRIPTION OF THE DRAWINGS

Further objects, features and advantages of the invention will become apparent upon consideration of the following detailed description with the drawings in which:

FIG. 3 is a plan view of a tubular member of the hollow lateral transfer retroreflector according to the invention;

FIG. 4 is an exploded, side elevational view of the hollow lateral transfer retroreflector according to the invention;

DETAILED DESCRIPTION OF THE PREFERRED EMBODIMENTS

Figure 1:
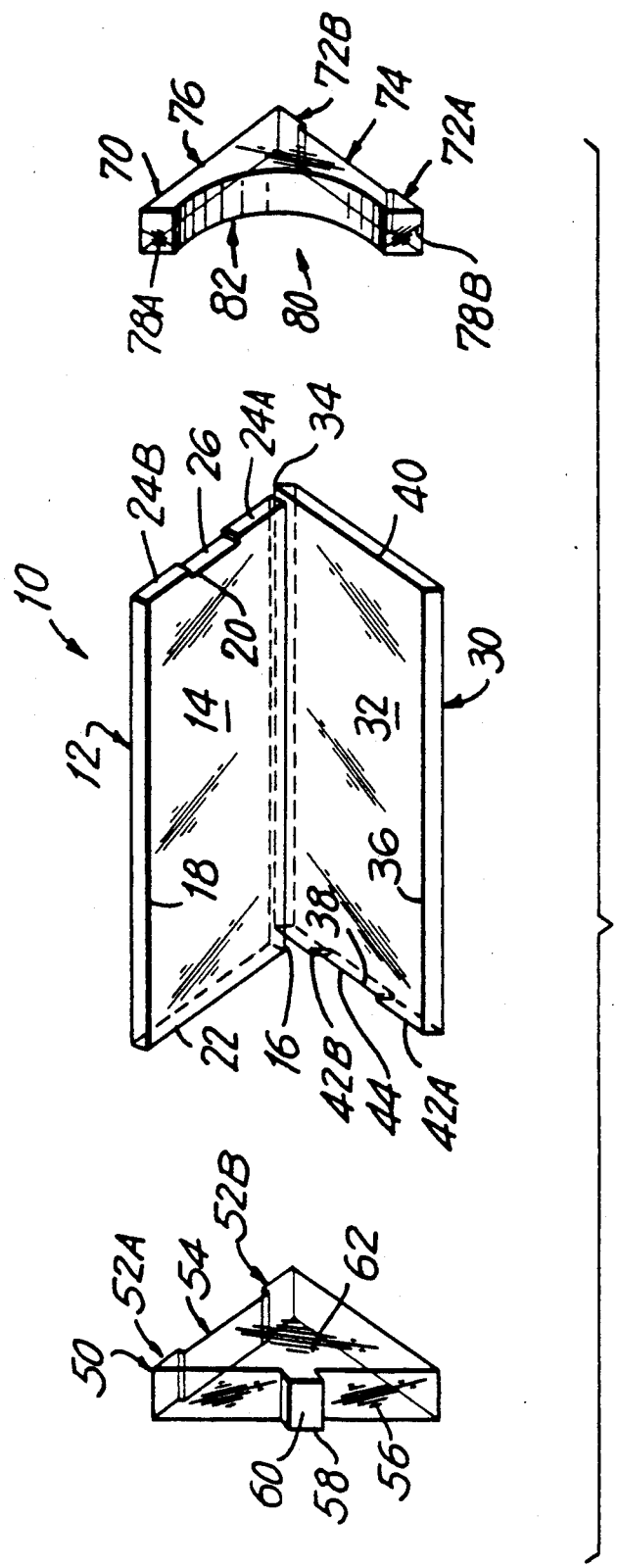
FIG. 1 is an exploded, perspective view of a hollow roof mirror in accordance with the invention.
Figure 2:
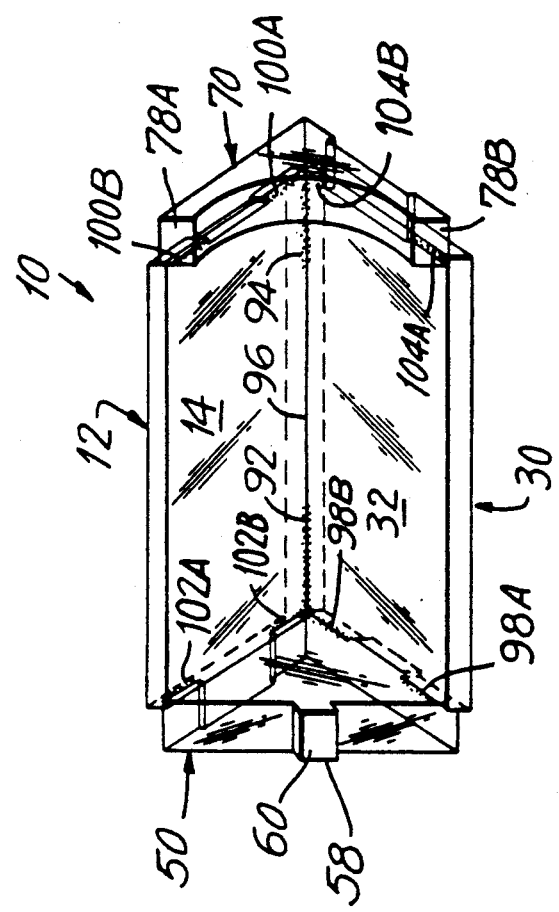
FIG. 2 is a perspective view of an assembled hollow roof reflector using the components of FIG. 1.

Referring to FIG. 1 and FIG. 2 a hollow roof mirror 10 according to the invention includes a first generally rectangular member 12 having a reflective surface 14, two length defining edges 16 and 18 and two width defining edges 20 and 22. Member 12 also has two edge surfaces 24A and 24B separated by a rectangularly shaped recess 26.

A second member 30 has a reflective surface 32, two length defining edges 34 and 36, two width defining edges 38 and 40, and two coplanar edge surfaces 42A and 42B separated by a rectangularly shaped recess 44.

While members 12 and 30 are generally made from optically flat glass, their planar surfaces 14 and 32, respectively, are made reflective by an optical coating or "silver", as is well known in the art.

Members 12 and 30 are preferably of substantially equal length. They are assembled with edge 16 in contact with planar surface 32 of member 30. Further, edge 16 is parallel to edge 34. Since member 12 and member 30 are generally assembled so as to be perpendicular to one another, a full edge surface of member 12 may be in contact with planar surface 32 of member 30.

Member 12 is displaced laterally from member 30 so that one end of member 12 extends past the end of member 30. Further, one end of member 30 extends past the end of member 12.

A generally triangularly shaped lower support panel 50 has two coplanar surfaces 52A and 52B separated by a rectangular recess 54. Further, lower support panel 50 has an edge surface 56 having a mounting projection 58 extending perpendicularly from surface 56. Projection 58 has a planar surface 60 which, when lower support panel 50 is assembled with the other components of hollow roof mirror 10, is disposed so as to be parallel to length defining edge 16 of member 12 and length defining edge 34 of member 30. Lower support panel 50 has a major planar surface 62.

Lower support panel 50 has a thickness which far exceeds the lengthwise displacement of member 12 with respect to member 30. Thus, as shown in FIG. 2, lower support panel 50 is included in the assembly of hollow roof mirror 10 so that coplanar surfaces 52A and 52B are affixed to planar surface 14 of member 12 while major planar surface 62 of hollow roof member 50 is affixed to coplanar surfaces 42A and 42B of member 30.

An upper support panel 70 includes two coplanar edge surfaces 72A and 72B separated by a rectangularly shaped recess 74. Upper support panel 70 also has an edge surface 76 and another two coplanar edge surfaces 78A and 78B. Upper support panel 70 also has a crescent shaped opening 80 which increases the effective aperture of the hollow roof mirror, as more fully described below. Upper support panel 70 has a major planar surface 82.

The thickness of upper support panel 70 is much greater than the lateral displacement of member 12 with respect to member 30. Thus, as shown in FIG. 2, upper support panel 70 is included in the assembly of hollow roof mirror 10 with a portion of coplanar surfaces 72A and 72B in contact with planar surface 32 of member 30, and coplanar surfaces 24A and 24B of member 12 in contact with major planar surface 82 of upper support panel 70.

Hollow roof mirror 10 is held together kinematically by the application of adhesive only at selected locations. As shown in FIG. 2, adhesive is applied at 92 and 94 to bond member 12 to member 30. However, most of the line or plane of joining is not bonded; that is there is a centrally located region 96 of significant length where no adhesive is applied.

Adhesive is also applied at 98A and 98B where coplanar surfaces 42A and 42B contact major surface 62 of the lower support panel 50. In a similar manner adhesive is applied at 100A and 100B between coplanar surfaces 24A and 24B and major surface 82 of upper support panel 70.

Adhesive is also applied at 102A and 102B between portions of each of coplanar surfaces of 52A and 52B and planar surface 14 of member 12. In a similar fashion adhesive is applied at 104A and 104B between portions each of coplanar surfaces 72A and 72B of upper support panel 70 and planar surface 32 of member 30.

Hollow roof mirror 10, assembled as shown, provides a fully kinematic assembly which is extremely rigid yet light in weight. Alignment of the mirrors with respect to one another is maintained to a high degree of accuracy even under conditions of vibration and large excursions in temperature. Further, due to the recesses in the various members which provide bonds of limited length, distortion of planar surfaces 14 and 32 due to stresses induced by changes in temperature is minimized.

For purposes of mounting, as is more fully described below with respect to FIGS. 5 and 6, lower support panel 50 and upper support panel 70 are sized and shaped so that surface 60 of projection 58 of lower support panel 50 is coplanar with surfaces 78A and 78B of upper support panel 70.

FIG. 3 to FIG. 6 illustrates the manner in which hollow roof mirror 10 forms one part of an assembly of a lateral transfer reflector also including a mirror panel 110 and a tubular member 130.

Mirror panel 110 may be formed of an optically transmissive glass, is substantially rectangular in shape and has a reflective planar surface 112 with a reflective coating 180, as well as a continuous planar edge surface 114. Coating 180 may be an ordinary "silver" coating or may be a beam splitter coating, as more fully described below. Mirror panel 110 also has two coplanar surfaces 116 and 118 separated by a rectangularly shaped recess 120 located on a first edge surface 115. Mirror panel 110 also has a second edge surface 122 which is perpendicular to planar surface 112 and coplanar surfaces 116 and 118. The manner in which mirror panel 110 is affixed to tubular member 130 is more fully discussed below.

Referring to FIG. 3 and FIG. 4, tubular member 130 is formed with relatively thin walls from fused quartz or fine annealed pyrex and is of generally rectangular cross-section. A first end terminates with a first slanting surface 132 at an, angle of 45° with respect to a longitudinal axis 134 of tubular member 130. A second end of tubular member 130 terminates with an inclined surface 136 which is also at an angle of 45° with respect to longitudinal axis 134 and is perpendicular to first slanting surface 132. The lower wall 138 of tubular member 130 has a second slanting surface 140 which is parallel to first slanting surface 132.

Referring specifically to FIG. 3, an upper wall 141 of tubular member 130 has a first generally circular opening 142 at a first end thereof. Opening 142 has a radius which is larger then the distance of the center of opening 142 from edge 144 of upper wall 141. Thus, edge 144 is not continuous but is broken by opening 142. Opening 142 is positioned so that it is above a portion of reflective planar surface 14 of member 12 and reflective planar surface 32 of member 30 of roof mirror 10 when it is assembled to tubular member 130.

Upper wall 141 has a second circular opening 146 which is positioned so as to be over a portion of mirror panel 110 when it is assembled to tubular member 130.

Coplanar surfaces 78A and 78B of upper support panel 70 are affixed to a portion 150 of first slanting surface 132 which defines the end of upper wall 141 of tubular member 130. Planar surface 60 of projection 58 of lower support panel 50 is affixed to a portion 152 of first slanting surface 132 that defines one end of lower wall 138 of tubular member 130. Thus, roof mirror 10 is supported on first slanting surface 132 at three coplanar regions. A suitable adhesive is used at these regions, as is shown in FIGS. 5, at 154, 156 and 158.

Figure 5:
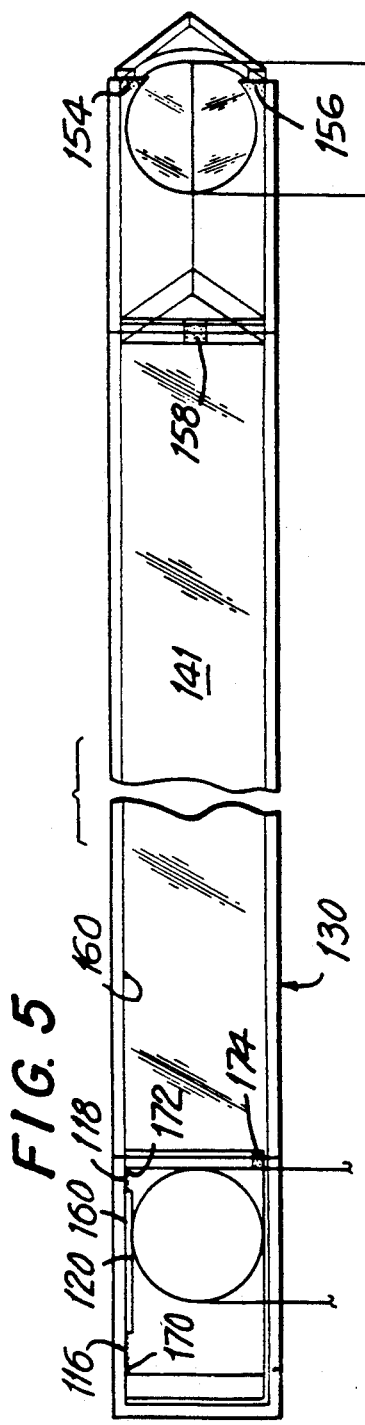
FIG. 5 is a plan view of an assembled lateral transfer reflector according to the invention.
Figure 6:
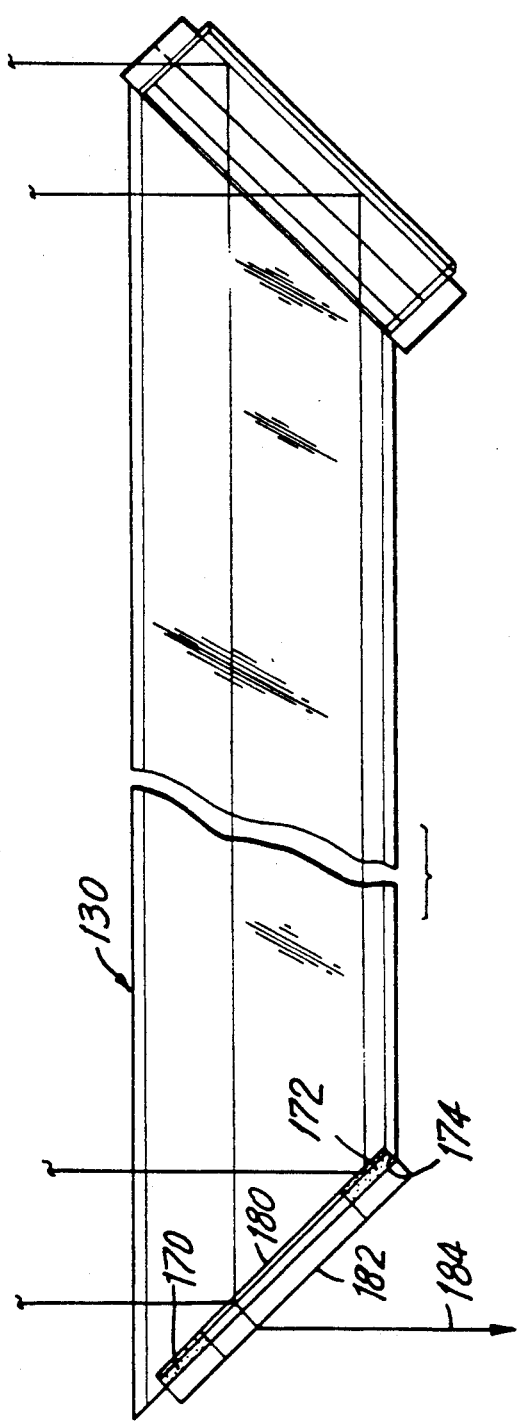
FIG. 6 is a side elevational view of the assembled lateral transfer reflector of FIG. 5.

Referring to FIGS. 4, 5 and 6, mirror panel 110 has a first edge surface 115, having coplanar edge surfaces 116 and 118, and recessed surface 120. Mirror Panel 110 is assembled to tubular member 130 so that a portion of coplanar edge surfaces 116 and 118 are affixed to an inner surface 160 of tubular member 130. Between edge surfaces 116 and 118 is recessed surface 120. Recessed surface 120 does not affix to inner surface 160, but remains separated therefrom, creating a space. Surface 160 is perpendicular to upper wall 141 and lower wall 138 of tubular member 130.

A portion of edge surface 122 of mirror panel 110, which is perpendicular to coplanar surfaces 116 and 118 is affixed to second slanting surface 140 of tubular member 130. Since mirror panel 110 is much thicker then the extent of second slanting surface 140 in a direction parallel to first slanting surface 132, a significant portion of edge 122 is not affixed to slanting surface 140, and significant portions of coplanar surfaces 116 and 118 are not affixed to surface 160.

Thus, as can be seen in FIGS. 5 and 6, mirror panel 110 to tubular member 130 at three points by the application of adhesive as represented at points 170, 172 and 174. It is only a small portion of the length of edge surface 122 which is most removed from coplanar surface 118 of mirror panel 110 which is adhered to second slanting surface 140 at 174.

Thus, roof mirror 10 and mirror panel 110 are kinematically mounted using a three point approach to tubular member 130. As noted above with respect to the structure of roof mirror 10, such mounting tends to make the lateral transfer reflector relatively insensitive to vibration and able to maintain precise alignment of an incoming beam with respect to the outgoing beam despite rather extreme changes in temperature. The use of a fused quartz or fine annealed pyrex tubular member also contributes to temperature stability.

As may be most readily appreciated from FIG. 5, opening 80 of upper support panel 70 increases the available aperture of roof mirror 10 and permits the lateral transfer retroreflector to receive and redirect light originating at a greater range of angles than would be possible if opening 80 were not present.

As noted above, and as is seen most clearly in FIGS. 4 and 6, 110 has a reflective coating 180. If surface 112 and opposing planar surface 182 are both optically flat and absolutely parallel to one another, and coating 180 is a beam splitter coating, then some of the light which passes through opening 146 and strikes coating 180 will pass through coating 180, through mirror panel 110 and will emerge from panel 110 to travel parallel to the incoming beam, as shown at 184. Depending on the nature of coating 180, this transmitted light may be of a particular frequency range, while light outside this range is reflected to roof mirror 10. In any event such a beam splitter coating permits the lateral transfer retroreflector according to the invention be used as a bore sighting device.

The adhesive used to assemble the components of the roof mirror and the lateral transfer retroreflector according to the invention may be any one of several well-known cements which provide adequate strength and performance over a required temperature range.

Although the invention has been described with respect to particular embodiments, it is to be understood that these embodiments are merely illustrative of the application of the principles of the invention. Numerous modifications may be made therein and other arrangements may be devised without departing from the spirit and scope of the invention.

What is claimed is:
1. A hollow roof mirror comprising:
a first member having a first reflective planar surface, a first length defining edge, and a first edge surface;
a second member having a second reflective planar surface, a second length defining edge and a second edge surface;
said first member and said second member being positioned with respect to one another that said first length defining edge of said first member contacts said second planar surface of said second member;

a first support panel for engaging said first planar surface of said first member and said second edge surface of said second member; and a second support panel for engaging said second planar surface of said second member and said first edge surface of said first member.

2. The hollow roof mirror of claim 1, wherein at least one of said first support panel and said second support panel has an opening therein, said opening defining part of an aperture for the transmission of light to or from said first planar surface of said first member and said second planar surface of said second member.

3. The hollow roof mirror of claim 1, wherein at least one of said first edge surface of said first member and said first edge surface of said second member has a recess therein, said recess defining a space between said member and a respective one of said support panels to which said edge surface is affixed.

4. The hollow roof mirror of claim 3, wherein said recess is centrally located along its respective edge surface.

5. The hollow roof mirror of claim 3, further comprising an adhesive disposed between said edge surfaces and respective support panels only at regions other than said recess.

6. The hollow roof mirror of claim 1, wherein at least one of said first support panel and said second support panel has a planar edge surface for affixation to a respective planar surface of one of said first member and said second member, said planar edge surface having a recess therein, said recess defining a space between said support panel and said planar surface.

7. The hollow roof mirror of claim 6, wherein said recess is centrally located along said planar edge surface of said support panel.

8. The hollow roof mirror of claim 6, further comprising an adhesive disposed between said planar edge surface of said support panel and respective planar surfaces of said member only at regions other than said recess.

9. The hollow roof mirror of claim 1, wherein one of said support panel has a support edge surface extending substantially parallel to a line along which said first member contact said second member, said support edge surface having a projection extending the therefrom said projection being for mounting said roof mirror.

10. The hollow roof mirror of claim 9, wherein said projection has a mounting surface which extends parallel to said line.

11. The hollow roof mirror of claim 10 wherein another of said support panels has a mounting edge surface extending parallel to said mounting surface of said projection, said another support panel also having an opening therein, said opening defining a recess in said mounting edge surface so that a first planar mounting surface is disposed to a first side of said recess and a second planar mounting surface is disposed to a second side of said recess opposite said first side 12. The hollow roof mirror of claim 11, wherein said mounting surface of said projection, said first planar mounting surface, and said second planar mounting surface are coplanar.

13. The hollow roof mirror of claim 11, wherein said opening is positioned and sized to define at least part of an aperture for the transmission of light to or from said first planar surface of said first member and said second planar surface of said second member.

14. The hollow roof mirror of claim 1, wherein said first member and said second member are substantially rectangular, and have substantially equal lengths in a direction along a line along which said first member contacts said second member.

15. The hollow roof mirror of claim 14, wherein said first member extends along said line past an edge of said second member.

16. The hollow roof mirror of claim 1, wherein said first member and said second member are position with respect to one another so that said first planar surface and said second planar surface are substantially perpendicular to one another.

17. The hollow roof mirror of claim 1, wherein said first member and said second member are positioned with respect to one another so that said first planar surface and said second planar surface are perpendicular to one another and said first edge surface of said first member contacts said second planar surface of said second member.

18. A hollow roof mirror comprising:
a first substantially rectangular planar member having two parallel width defining edges, two parallel length defining edges, and a first reflective planar surface;
a second substantially rectangular planar member having two parallel width defining edges, two parallel length defining edges, and a second reflective planar surface;
said second member having substantially the same length and width as the first member;
said first member and said second member being assembled so that a length defining edge of said first member contacts the planar surface of the second member and extends past a width defining edge of said second member;
a first support panel for affixation to an edge surface of said first member adjacent a width defining edge of said first member and said second planar surface of said second member;
a second support panel for affixation to an edge surface of said second member adjacent a width defining edge of said second member and the first planar surface of said first member.

19. A lateral transfer retroreflector comprising:
a tubular member having a first slanting surface at a first end thereof;
a roof mirror having two reflective surfaces and mounted to said first slanting surface, said roof mirror having three coplanar mounting surfaces for mounting to said first slanting surface;
a mirror panel having a reflective surface for mounting at a second end of said tubular member opposite said first end so that said reflective surface of said mirror panel is perpendicular to said two reflective surfaces of said roof mirror; and
said tubular member having openings so that light can pass through said tubular member to said roof mirror and said mirror panel.

20. The lateral transfer retroreflector of claim 19, wherein said roof mirror comprises:
a first planar member having a first reflective surface;
a second planar member having a second reflective surface;
a first support panel and a second support panel, said support panels being for supporting said first planar member and said second planar member at a predetermined angle with respect to one another; and said second support panel having a second support edge including a second one of said coplanar surfaces and a third one of said coplanar surfaces.

21. The lateral transfer retroreflector of claim 20, wherein said second coplanar surface and said third coplanar surface are separated by an opening in said second support panel.

22. The lateral transfer retroreflector of claim 21, wherein said opening is sized-, shaped and positioned so that said opening defines part of an aperture for the transmission of light to or from said first reflective surface of said first member and said second reflective surface of said second member.

23. The lateral transfer retroreflector of claim 19, further comprising an adhesive for securing each of said three coplanar surfaces to said first slanting surface.

24. The lateral transfer retroreflector of claim 19, wherein said mirror panel has an edge surface for affixation to a first inner surface of said tubular member, said edge having a recess therein, and said recess defining a space between a portion of said edge surface and said inner surface.

25. The lateral transfer retroreflector of claim 24, wherein said recess is centrally located along said first edge surface of said mirror panel so as to define a first planar surface to one side of said recess and a second planar surface on another side of said recess, said first planar surface and said second planar surface being coplanar.

26. The lateral transfer retroreflector of claim 19, wherein said tubular member has a rectangular cross-section.

27. The lateral transfer retroreflector of claim 26, wherein said mirror panel is substantially rectangular and has a first edge surface for affixation to an inner surface or said tubular member, said edge having a recess therein, and said recess defining a space between a portion of said edge surface and said inner surface.

28. The lateral transfer retroreflector of claim 27 whrein said recess is centrally located along said first edge surface of said mirror panel so as to define a first planar surface to one side of said recess and a second planar surface on another side of said recess, said first planar surface and said second planar surface being coplanar.

29. The lateral transfer retroreflector of claim 27, wherein said tubular member has a second slanting surface at said second end, said second slanting surface being substantially parallel to said first slanting surface, said second slanting surface being affixed to a second edge surface of said mirror panel.

30. The lateral transfer retroreflector of claim 29, further comprising an adhesive between only a portion of said second slanting surface, and said second edge surface affixed thereto.

31. The lateral transfer retroreflector of claim 19, wherein said mirror panel has edge surfaces substantially perpendicular to said reflective surface, said edge surfaces having three separate planar securing portions for contacting inner surfaces of said tubular member.

32. The lateral transfer retroreflector of claim 19, wherein said tubular member has a rectangular cross-section, a second slanting surface parallel to said first slanting surface at said second end of said tube, said mirror panel is rectangular, and has edge surfaces substantially perpendicular to said reflective surface, a first of said edge surfaces contacting an inner surface of said tubular member and a second edge surface perpendicular to said first edge surface contacting said second slanting surface.

33. The lateral transfer retroreflector of claim 31, wherein said first edge surface has a recess therein, said recess defining a space between a portion of said first edge surface and said inner surface.

34. The lateral transfer retroreflector of claim 33, wherein said recess is centrally located along said first edge surface of said mirror panel so as to define a first planar surface to one side of said recess and a second planar surface on another side of said recess, said first planar surface and said second planar surface being coplanar.

35. The lateral transfer retroreflector of claim 34, further comprising an adhesive between said first planar surface and said inner surface of said tubular member, said second planar surface and said inner surface of said tubular member, and between said second edge surface and said second slanting surface only at a region most remote from said inner surface.

36. The lateral transfer retroreflector of claim 19, wherein said tubular member is formed of material having dimensional stability with respect to changes in temperature.

37. The lateral transfer retroreflector of claim 36, wherein said material is one of fused quartz and fine annealed pyrex.

38. The lateral transfer retroreflector of claim 19, wherein said mirror panel is formed of a light transmissive material, and said reflective surface is a beam splitter coating.

39. The lateral transfer retroreflector of claim 38, wherein said mirror panel has a rear surface parallel to said reflective surface, whereby a portion of light striking said reflective surface travels through said mirror panel and then parallel to light striking said mirror panel.

* * * * *